US008055901B2

(12) United States Patent
Behm et al.

(10) Patent No.: US 8,055,901 B2
(45) Date of Patent: Nov. 8, 2011

(54) OPTICAL SIGNATURE TO ENABLE IMAGE CORRECTION

(75) Inventors: William F. Behm, Roswell, GA (US); Charles F. Cassidy, Cumming, GA (US); Sten H. Mejenborg, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 12/725,853

(22) Filed: Mar. 17, 2010

(65) Prior Publication Data

US 2010/0239118 A1    Sep. 23, 2010

Related U.S. Application Data

(60) Provisional application No. 61/160,868, filed on Mar. 17, 2009.

(51) Int. Cl.
| | |
|---|---|
| H04L 29/06 | (2006.01) |
| H04L 9/32 | (2006.01) |
| H04L 17/02 | (2006.01) |
| G09C 3/08 | (2006.01) |
| H04N 7/167 | (2011.01) |
| H04N 1/44 | (2006.01) |
| H04N 7/16 | (2011.01) |
| H04K 1/00 | (2006.01) |
| B42D 15/00 | (2006.01) |
| G03G 15/10 | (2006.01) |
| G03G 15/01 | (2006.01) |

(52) U.S. Cl. ......... 713/176; 713/159; 713/172; 380/51; 380/52; 380/201; 380/216; 380/245; 380/250; 380/251; 725/19; 725/23; 283/77; 283/78; 283/113; 399/64; 399/301

(58) Field of Classification Search .................. 380/212, 380/51, 52, 201, 216, 245, 250, 251; 713/159, 713/172, 176; 725/19, 23; 283/77, 78, 113; 399/64, 301
See application file for complete search history.

(56) References Cited

U.S. PATENT DOCUMENTS 7,252,222 B2 * 8/2007 Finnerty et al. ............... 235/375
(Continued)

FOREIGN PATENT DOCUMENTS

EP      0 764 944       3/1997

OTHER PUBLICATIONS

"Geometric Distortions Resilient Watermarking Technique Based on 2D color Histogram Modification", Hernandez M. Cedillo et al., Electrical Engineering, Computing Science and Automatic Control, 2008, CCE 2008, 5th International Conference On, IEEE, Piscataway, NJ, USA, Nov. 12, 2008, pp. 286-291, XP031378443 ISBN:978-1-4244-2498-6 abstract.
"Les documents écirts", Rémy Mullot, 2006, Hermés-Lavoisier, XP008123120 ISBN: 9782746211438, pp. 191-193, the whole document.

(Continued)

Primary Examiner — Mohammad Reza
(74) Attorney, Agent, or Firm — Dority & Manning, P.A.

(57) ABSTRACT

A method and system for performing document image correction using a document reader is disclosed. The method includes generating a document image representative of a document having a deformation; decoding an optical pattern embedded in the document from the document image to determine an optical signature for the document; receiving document classification data associated with the optical signature; and applying an image correction technique to the document image based on the document classification data to generate a corrected document image. A document capable of being read by a document reader is also disclosed. The document includes a substrate and an optical pattern embedded on the substrate. The optical pattern is part of a background pattern printed on the substrate. The optical pattern defines an optical signature unique to the particular class of document and is associated with document classification data for the document.

15 Claims, 4 Drawing Sheets

U.S. PATENT DOCUMENTS

| | | | |
|---|---|---|---|
| 7,364,091 B2 | 4/2008 | Streeter | |
| 7,747,082 B2 * | 6/2010 | Bressan | 382/224 |
| 7,864,346 B2 * | 1/2011 | Ryan et al. | 358/1.12 |
| 2003/0034463 A1 * | 2/2003 | Tullis | 250/566 |
| 2005/0258234 A1 | 11/2005 | Silverbrook et al. | |
| 2006/0164682 A1 | 7/2006 | Lev | |
| 2008/0091751 A1 * | 4/2008 | Vendelin | 707/E17.019 |
| 2009/0059316 A1 | 3/2009 | Irwin, Jr. et al. | |
| 2009/0078767 A1 * | 3/2009 | Lapstun | 235/454 |

OTHER PUBLICATIONS

"Chapter 18: Analysis of Printed Forms" In: H. Bunke, P.S.P. Wand: Handbook of Character Recognition and Document Image Analysis 1997, World Scientific Publishing Company, XP008123117 ISBN:982022270X, pp. 485-502 the whole document.

PCT Search Report, Jun. 16, 2010.

* cited by examiner

OPTICAL SIGNATURE TO ENABLE IMAGE CORRECTION

The present application claims priority to U.S. Provisional Application Ser. No. 61/160,868, filed Mar. 17, 2009.

BACKGROUND

There are many known methods to authenticate a document such as a scratch off lottery ticket, on-line lottery ticket, receipt, bet-slip, admission ticket, delivery slip, etc. to help prove that the document is authentic. For example, the most basic methods include imposing or embossing a visible seal on the document, using a watermark, using a color shifting ink, etc., all of which are readily visible to a person viewing the document. Other methods include the use of microprinting or heat or light sensitive ink.

One technique for document authentication includes encoding authentication information and other data into optical identifiers or other markings printed or embedded on the document. In addition to document authentication, optical identifiers may be used to provide copyright protection or to encode additional information such as information relevant to a particular lottery game in the case of a printed lottery ticket.

Optical identifiers may include, for example, printed one-dimensional or two-dimensional barcodes or embedded optical patterns that define optical signatures for the document. Exemplary optical signatures for use in authenticating lottery tickets are disclosed in U.S. Pat. Nos. 7,252,222 and 7,364,091 which are incorporated herein by reference for all purposes. Optical signatures may be defined by variety of optical patterns that may be printed or embedded using a variety of types of ink or printing techniques. For example, certain optical patterns may be printed using infrared responsive ink that is invisible under white light.

To process an optical identifier or other marking, a document reader including a scanner or camera is used to capture a digital image of the document. An inexpensive camera, linear sensor, or contact image sensor may be used to provide this image capture functionally. Once the document reader has captured a digital image of the document, various processes and analyses are performed on the document image to determine, for example, if the document is authentic. These processes may include decoding authentication information or other data encoded into an optical signature or barcode. An exemplary document reader is disclosed in U.S. patent application Ser. No. 12/200,367 which is incorporated by reference for all purposes.

Proper analysis of optical identifiers and other markings using a camera-based document reader requires a substantially flat and undistorted image of the optical identifier or other marking. This presents a challenge as images captured by the reader may become distorted due to folds and wrinkles in the document placed in the document reader. Thus, document readers must be able to provide a corrected document image that removes imperfections caused by folds or wrinkles in the document scanned by the reader.

In the general case of image deformation on a slope, the image may be corrected using known trapezoidal correction techniques or other known techniques. However, to apply these techniques correctly, geometric information about the document such as the initial shape and size of the document must be known. This presents a further challenge due to documents varying widely in shape, size, and color. For instance, instant scratch off lottery tickets are available in a wide variety of shapes, sizes and colors.

Document size and shape may be determined using optical identifiers or other markings printed or embedded on the document, such as the game number in the case of lottery tickets. For example, the optical identifiers or other information embedded on the document may be linked or associated with geometric or other document information stored in a database. However, decoding the optical identifiers or other markings when the correct shape and image resolution of the document are unknown is a problem in its own right. Indeed, the optical identifiers may be so distorted that they cannot be properly read or scanned by the document reader.

The use of optical identifiers with more robust orientation marks in conjunction with a quiet zone may be capable of being decoded despite the presence of folds and wrinkles in the document image. For example, certain one-dimensional or two-dimensional bar codes may be capable of being decoded by a document reader despite imperfections in the document image caused by folds and wrinkles in the document placed in the reader. However, these robust optical identifiers usually take up significant document space and may be undesirable for use in many documents. For instance, such robust identifiers may not be desirable for use on instant lottery tickets because of their impact on space available for instant ticket graphics and play area.

Thus, a need exists for enabling image correction of documents in an optical reader that overcomes these deficiencies. The present disclosure provides a document having an optical pattern that is decoded by the optical reader to determine an optical signature associated with geometric or other information about the document. The optical pattern may be a part of the background pattern of the document or otherwise camouflaged to the holder of the document. The document reader uses document classification information associated with the optical signature to apply image correction techniques and to provide a corrected document image.

SUMMARY

Objects and advantages of the invention will be set forth in part in the following description, or may be obvious from the description, or may be learned through practice of the invention.

In one exemplary embodiment, the present invention includes a method for performing document image correction with a document reader. The method includes generating a document image representative of a document having a deformation; decoding an optical pattern embedded in the document from the document image to determine an optical signature for the document; receiving document classification data associated with the optical signature; and applying an image correction technique to the document image based on the document classification data to generate a corrected document image.

In variations of this particular embodiment, the method may include decoding an indentifier embedded in the document from the corrected document image to authenticate the document. The identifier may be a one-dimensional or two-dimensional barcode, an optical identification pattern encoding an optical signature, or other identifier encoding or providing information or data about the document.

In other variations of this particular embodiment, the optical pattern may be defined by a plurality of pixels in the document image. The plurality of pixels may include a plurality of red pixels, a plurality of green pixels, and a plurality of blue pixels. The optical signature may be determined based at least in part on the number red pixels, the number of green pixels, and the number of blue pixels in the optical pattern.

For instance, the optical signature may be determined based at least in part on a histogram function having inputs comprising the number of red pixels, the number of green pixels, and the number of blue pixels in the optical pattern. In another embodiment, the optical signature may comprise a string of characters, each character in the optical signature being determined as follows:

$D=f_d$ (number of pixels in the optical pattern);
$R=f_r$ (number of red pixels in the optical pattern);
$G=f_g$ (number of green pixels in the optical pattern);
$B=f_b$ (number of blue pixels in the optical pattern);
$S=f_s$ (a shape indicator).

In a further variation of this particular embodiment, the optical pattern may only be located on a portion of the document. For example, the optical pattern may be located along an edge of the document. In this manner, interferences with the document, such as the removal of latex playing fields on scratch off lottery tickets, do not affect the determination of the optical signature associated with the document.

In still a further variation of this particular embodiment, the optical pattern is part of the background pattern of the document or is otherwise not readily visible to a holder of the document. For instance, the optical pattern may be printed in an infrared responsive ink that is invisible under white light. In these embodiments, the optical pattern does not interfere with other items printed or embedded on the document. For instance, in the case of instant lottery tickets, the optical pattern does not take up space available for instant ticket graphics or playing fields.

In still a further variation of this particular embodiment, the optical signature of the document is unique to each particular class of document. The optical signature is associated with document classification data for the particular class of document. The document classification data may include, for example, the optical signature for the particular class of document as well as the area, length, width, document type, and map of key coordinates for the document. In the case of lottery tickets, the document classification data may include information such as lottery game number. The document classification data is used by the document reader to generate a corrected document image using known image correction techniques.

Another embodiment of the present invention is directed to a system for authenticating lottery tickets having a deformation. The system includes a document reader adapted to generate a document image of the lottery ticket. The system also includes a controller configured to decode an optical pattern embedded on the lottery ticket to determine an optical signature. The optical signature is unique to the particular class of lottery ticket. The system further includes a database configured to store document classification data associated with the optical signature for the lottery ticket. The controller is configured to receive the document classification data associated with the optical signature for the lottery ticket and to generate a corrected document image of the lottery ticket based on the document classification data. The controller may also be configured to decode identifiers embedded on the lottery ticket from the corrected document image in order to authenticate the lottery ticket.

A further embodiment of the present invention is directed to a document capable of being analyzed by a document reader. The document includes a substrate and an optical pattern embedded on the substrate. The optical pattern is a part of a background pattern printed on the substrate. The optical pattern defines an optical signature unique to the particular class of document. The optical signature is associated with document classification data for the document.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
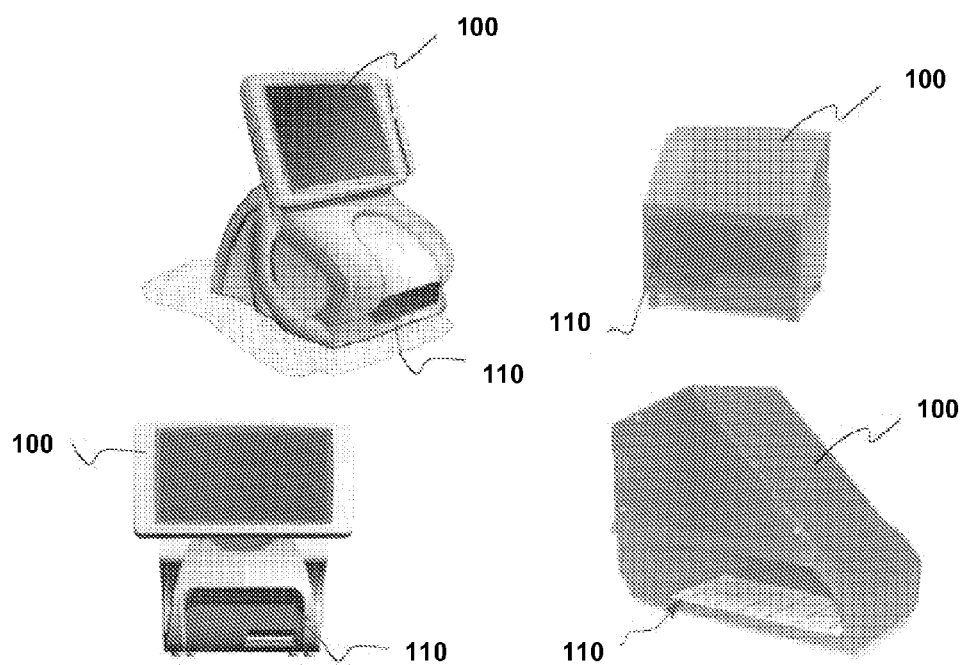
FIG. 1 illustrates exemplary document readers used in accordance with embodiments of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference now to FIG. 1, several exemplary document readers 100 that may be used in accordance with embodiments of the present invention are disclosed. Each document reader 100 includes an opening 110 for operator access. The opening 110 allows for the operator to insert a document to be read by the document reader 100. Each document reader 100 includes a scanner (e.g. a camera based scanner) but may also include other components such as a display monitor or control panel. The document reader may be used to read a variety of types of documents, including on-line lottery tickets, scratch off lottery tickets that have been scratched, scratch off lottery tickets that have not been scratched, scratch game booklets, lottery game coupons, lottery game receipts, admission tickets, delivery slips, receipts, bet slips, or any other document.

Figure 3:
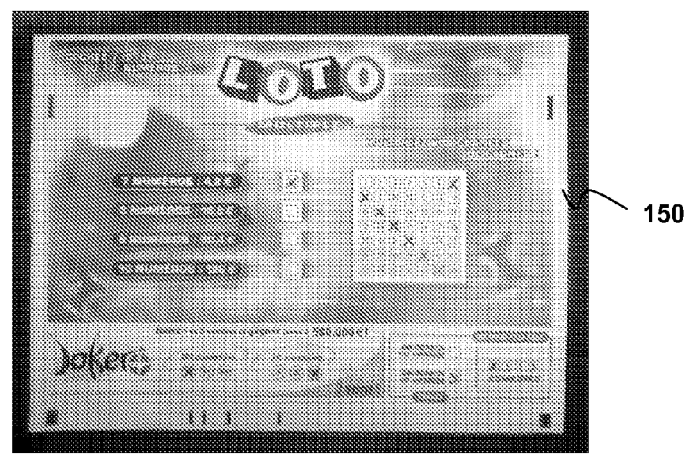
FIG. 3 depicts an exemplary document image of a lottery ticket according to one embodiment of the present invention.

The document reader 100 may be a camera-based document reader that utilizes a digital camera to capture an image of a document inserted into the reader 100. An exemplary digital image of an instant lottery ticket 150 is illustrated in FIG. 3. The digital camera used to scan the document may be, for example, a 5-megapixel digital color camera and may be configured to provide a resolution of more than 12 dots per millimeter for a document resting on the floor of the document reading area of the document reader 100. The digital camera may be interfaced to a reader electronics board 200 where image processing is performed by a controller 210 designed to accommodate data feeds from multiple sources. The operation of the digital camera may be directly controlled through controller 210. The digital camera may be controlled to perform various functions and invoke numerous features, including motion detection, dynamic object tracking, contrast, exposure, color filtering, lens correction, night vision and other features.

For example, in particular embodiments, the document reader may utilize a single camera to capture both white and infrared (IR) light images. For instance, the document reader may include a plurality of both white light and IR light LEDs. The controller 210 of the document reader may be adapted to control white light and IR light LEDs so that both white and infrared light images may be captured by the document reader 100. For instance, when a white light image is being captured, the IR LEDs are powered off and vice versa.

The document reader 100 may also include an enclosure designed to reduce or eliminate white ambient light noise from the document reading area. The document reader 100 may also have a configuration adapted to facilitate proper placement of the documents into the document reader 100 by the operator. In addition, the document reader 100 may utilize two cameras mounted side-by-side to capture and process document images to accomplish one or more of the following: a) reduce or eliminate glare; b) reduce errors induced by a bent or bowed document; or c) enable multi-spectral scanning of the same document at the same time. Using the teachings disclosed herein, it should be readily appreciated that particular embodiments of document readers 100 are not meant as a limitation of the invention, and that embodiments of the present invention may encompass any configuration of features and functionality to allow capturing of a document image.

Figure 2:
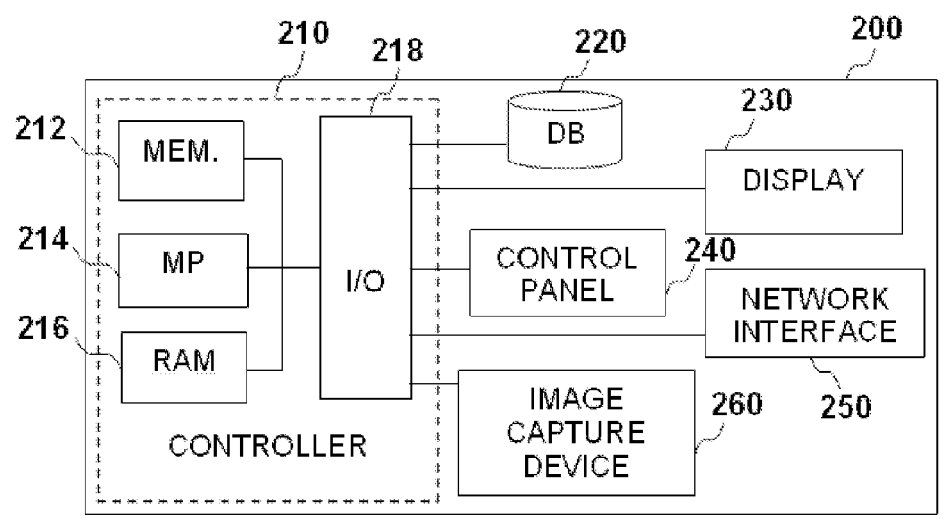
FIG. 2 provides a block diagram of an exemplary document reader used in accordance with embodiments of the present invention.

Referring now to FIG. 2, a block diagram 200 of an exemplary document reader is disclosed. As shown, the document reader may include a controller 210, database 220, display 230, control panel 240, network interface 250, and image capture device 260. As discussed above, the image capture device 250 may be a digital camera or any other device used to capture an image of a document inserted into the document reader 100. Image capture device 250 may also include one or more sets of LEDs or other light sources used to generate varying types of images of the document.

As illustrated, controller 210 may include a memory 212 for storing programs and routines, a microprocessor 214 for executing stored routines, random access memory (RAM) 216, and an input/output (I/O) bus 218. In a particular embodiment, the controller may be a high performance convergent multimedia Blackfin processor, from Analog Devices. This image processor operates at 400 MHz/1,000 MMACS (Millions of Multiply Accumulates) with two independent DMA controllers. It also features multiple enhanced parallel peripheral interfaces (EPPI), which are used to interface directly with the digital camera, as well as a pixel compositor hardware accelerator.

Controller 210 is interfaced with database 220. Database 220 preferably stores document classification data unique to each particular class of document to be scanned or read by the document reader 100. This document classification data may include, for example, an optical signature associated with the particular document, geometric data associated with the document, such as area, length, and width of the document, and document type. In the case of lottery tickets, the document classification data may include information such as type of lottery game embodied in the document and game number associated with the document. The document classification data is used by a document reader 100 to perform known image correction techniques to a document image, such as trapezoidal image correction techniques and other known techniques.

FIG. 3 illustrates an exemplary document image of lottery ticket 150 taken by a document reader 100. The document image of the lottery ticket 150 may be processed or analyzed by the controller 210 of the document reader 100 to authenticate the lottery ticket 150 and to perform additional functions. The lottery ticket 150 may include one or more optical identifiers or other markings used to authenticate the lottery ticket 150. For instance, the lottery ticket 150 illustrated in FIG. 3 may include an identifier such as an optical pattern embedded on the lottery ticket as disclosed in U.S. Pat. Nos. 7,252,222 and 7,364,091. The optical pattern may encode an optical authentication signature. An optical reader 100 may perform various processes and analyses on the document image to decode the optical authentication signature of the lottery ticket 150. The optical authentication signature is then used to authenticate the lottery ticket 150. In other embodiments, the document may include a one-dimensional or two-dimensional bar code that is used to authenticate the document. The one-dimensional or two-dimensional bar code is read by the document reader 100 to authenticate the document.

Figure 5A:
FIGS. 5a-5c illustrate distortions in a document image caused by deformations in an exemplary lottery ticket.
Figure 5B:
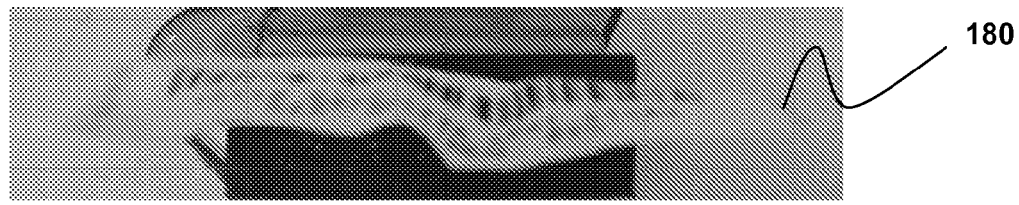
Figure 5C:

Proper analysis of optical identifiers and other markings using a camera-based document reader requires a substantially flat and undistorted image of the document. The lottery ticket 150 depicted in FIG. 3 conforms to this requirement, being substantially flat with no distortions caused by folds or wrinkles in the lottery ticket. However, as shown in FIG. 5a-5c, document images may contain many distortions due to folds or wrinkles in the document. For instance, FIG. 5a depicts a side view of a lottery ticket 150 having deformations including wrinkles and folds in the lottery ticket 150. FIG. 5b depicts a view of an identifier 180 printed on the lottery ticket 150 having deformations. FIG. 5c depicts a document image of the lottery ticket 150 that illustrates the distorted image of identifier 180 due to folds or wrinkles in the lottery ticket 150.

To address this problem, the document reader 100 of the present disclosure is configured to perform a variety of image correction techniques to remove distortions in the document image caused by folds or wrinkles in the document. These image correction techniques may include trapezoidal correction techniques or other known techniques. For instance, in one embodiment, the image correction technique may include comparing grid or key point locations on the distorted image to anticipated grid or key point locations for the document. The document reader remaps grid or key point locations extracted from the distorted image to anticipated grid or key point locations in a corrected image. Holes or spaces in the document image may be filled with predefined document data.

To apply image correction techniques correctly to the distorted image, document classification data about the document, such as the initial shape and size of the document, must be known. This presents a further challenge due to documents varying widely in shape, size, and color. For instance, instant scratch off lottery tickets are available in a wide variety of shapes, sizes and colors.

The present disclosure addresses this issue by providing each class or category of document to be read by the document reader with a unique and robust optical pattern that encodes an optical signature associated with document classification data for the document. The optical pattern is capable of being analyzed by a document reader despite common distortions in the document image arising from most folds or wrinkles in the document. The optical reader decodes the optical pattern to determine a unique optical signature associated with the document and to receive document classification data associated with the optical signature. The document classification data is used to apply image correction techniques to the document image to remove distortions in the document image arising from folds or wrinkles in the document.

Figure 4:
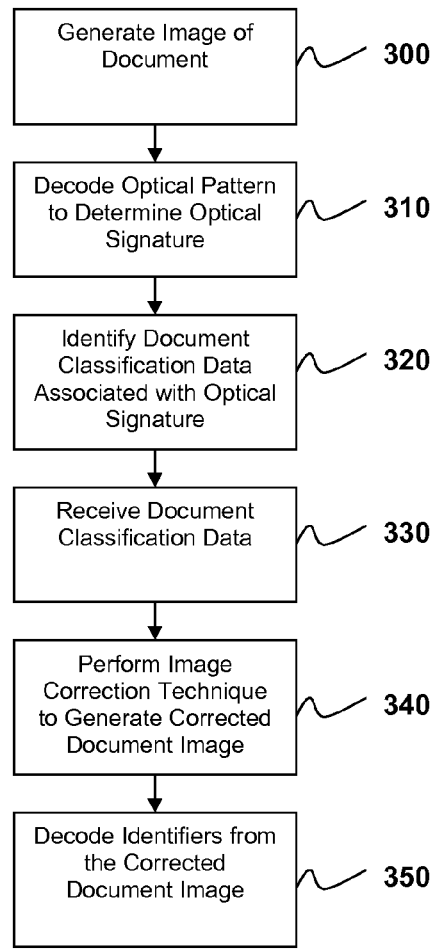
FIG. 4 provides a flow diagram of the exemplary steps associated with a method according to one embodiment of the present invention.

Referring now to FIG. 4, exemplary steps associated with a method for performing document image correction with a document reader according to one embodiment of the present invention will be set forth in detail. At step 300, a document image representative of a document having a deformation is generated. The document image may be captured by a digital camera or any other known device for capturing a document image. Exemplary document images of a various lottery tickets 150 are depicted in FIG. 3 and FIG. 5c. The document image typically comprises a plurality of pixels that includes a plurality of red pixels, a plurality of green pixels, and a plurality of blue pixels.

At step 310, the document reader 100 decodes an optical pattern embedded in the document from the document image to determine an optical signature for the document. Details with respect to the optical pattern and optical signature will now be set forth in detail.

Each class or category of document to be read by the document reader carries a unique optical pattern embedded on the document. For instance, in the case of instant lottery tickets, a document embodying one particular lottery game will have optical pattern A printed or embedded on the lottery ticket. A document embodying a different lottery game will have a different optical pattern B printed or embedded on the lottery ticket. The optical pattern may include a variety of colors, shapes, and designs and may be printed or embedded using a variety of techniques. For instance, the optical pattern may be printed using an infrared responsive ink that invisible under white light.

The optical pattern printed on the document encodes an optical signature associated with a particular class or category of document. Each particular class or category of document carries a unique optical signature. The optical signature comprises a known mathematical value or string of characters derived from the optical pattern embedded on the document.

For instance, the optical pattern embedded on a particular document may be defined or represented by a plurality of pixels in a digital image of the document. The plurality of pixels includes a plurality of red pixels, a plurality of green pixels, and a plurality of blue pixels. The optical signature encoded by the optical pattern may be a mathematical value or string of characters determined at least in part on the number of red pixels, the number of green pixels, and the number of blue pixels that make up the optical pattern in the document image.

For example, one particular function for deriving the optical signature from the optical pattern is a color histogram of the optical pattern. A histogram is a graphical display of frequencies displayed as bars. A histogram is used to graphically illustrate what percentage of several occurrences fall into a particular category. The categories are usually specified as non-overlapping intervals of some variable.

Mathematically, a histogram may be considered a mapping $m_i$ that counts the number of observations that fall into various disjoint categories or bins. A histogram may be defined according to the following relationship:

$$n = \sum_{i=1}^{k} m_i$$

where n is equal to total number of observations, k is equal to the total number of bins, and $m_i$ counts that number of observations that fall into the various bins, A cumulative histogram function counts the cumulative number of observations in all of the bins up to the specified bin and may be defined as:

$$M_i = \sum_{j=1}^{i} m_j$$

As set forth above, a color histogram function can provide substantial mathematical power to the optical signature. The output of the color histogram function defines a mathematical value unique to each particular optical pattern. For instance, one particular class of document having optical pattern A with x, y, and z red, green, and blue pixel values will have a different histogram function output than a class of document having optical pattern B with a, b, and c red, green, and blue pixel values. Thus, a histogram function may be used to define a unique optical signature for each particular class or category of documents to be read by a document scanner.

In another embodiment, the optical signature may comprise a string of characters f(D, R, G, B, S) with each character in the optical signature being determined as follows:
D=$f_d$ (number of pixels in the optical pattern);
R=$f_r$ (number of red pixels in the optical pattern);
G=$f_g$ (number of green pixels in the optical pattern);
B=$f_b$ (number of blue pixels in the optical pattern);
S=$f_s$ (a shape indicator).

The shape indicator S of the optical signature can be a character representative of the shape of the document. For instance, the shape indicator may indicate whether the document has a square shape, triangular shape, trapezoidal shape, circular shape, complex shape or any other shape. The shape indicator S may also be representative of the number of corners in a document or the locations of key document coordinates.

Similar to the output of the histogram function, the string of characters f(D, R, G, B, S) will be unique to each particular class or category of document to be read by the document reader. For instance, one particular class of document having optical pattern A with x, y, and z red, green, and blue pixel values will have a different string of characters f(D, R, G, B, S) than a class of document having optical pattern B with a, b, and c red, green, and blue pixel values. Thus, the sting of characters f(D, R, G, B, S) may be used to define a unique optical signature for each particular class or category of documents to be read by a document scanner.

Because each category of document carries a unique optical signature, the document reader may be able to readily identify which category of documents a particular document belongs to simply by decoding the embedded optical pattern on the document. The document reader 100 will then be able to receive document classification data associated with the particular class or category of document and use the document classification data to generate a corrected document image using a known image correction technique.

The optical pattern and optical signature method of the present disclosure may be designed or adapted to provide numerous advantages. For example, the optical pattern defining the optical signature for the document may only be located on a portion of the document, such as along the edge of the document. In the case of a scratch off lottery ticket, the optical identifier may be located away from the playing fields on the lottery ticket. In this manner, color variations arising from the removal of latex coverings over the lottery ticket playing fields do not affect the optical pattern or optical signature associated with the document.

The optical pattern defining the optical signature may also be camouflaged by incorporating the optical pattern into the background pattern of the document. In this embodiment, the optical pattern does not take up valuable document space or serve as a distraction to the holder of the document. For instance, in the case of scratch off lottery tickets, the optical pattern does not impose a limit on the space available for instant ticket graphics or playing fields. Moreover, the optical pattern does not operate as a distraction to the player of the instant lottery ticket.

In another embodiment, the optical pattern may comprise an IR visible grid printed using an invisible IR responsive ink. The IR visible grid would be invisible when the document is under a white light. The IR visible grid could be detected by the document reader 100 by taking an IR image of the document. The IR visible grid could then be used to perform necessary trapezoidal corrections to the documents using known image correction techniques.

Referring back to FIG. 4 at step 320, optical identification data associated with the optical signature is identified in the document reader database. As set forth above, document classification data may include, for example, an optical signature associated with the particular document, geometric data associated with the document, such as area, length, and width of the document, and document type. In the case of lottery tickets, the document classification data may include information such as type of lottery game embodied in the document and game number associated with the document.

The controller 210 of the document reader 100 receives the document classification data at step 330 and generates a corrected document image using the document classification data at step 340. The corrected document image is generated using known image correction techniques such as trapezoidal correction techniques. Once the corrected document image has been generated, the document reader may accurately decode identifiers such as barcodes or other optical identification patterns embedded in the document as illustrated at step 350.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of performing document image correction with a document reader, comprising:
generating a document image representative of a document having a deformation, each document belonging to a particular class of document;
decoding an optical pattern embedded in the document from the document image to determine an optical signature for the document, the optical signature is unique to each particular class of document, wherein the optical signature is determined based on a histogram function, the histogram function having inputs comprising the number of red pixels, the number of green pixels, and the number of blue pixels in the optical pattern;
receiving document classification data associated with the optical signature wherein the classification data is unique for each particular class of document;
applying an image correction technique to the document image based on the document classification data to generate a corrected document image; and
wherein the method further comprises decoding an identifier embedded in the document from the corrected document image to authenticate the document.

2. The method of claim 1, wherein the identifier comprises a barcode or an optical identification pattern.

3. The method of claim 1, wherein the optical pattern is defined by a plurality of pixels in the document image, the plurality of pixels comprising a plurality of red pixels, a plurality of green pixels, and a plurality of blue pixels.

4. The method of claim 3, wherein the optical signature is determined based at least in part on the number of red pixels, the number of green pixels, and the number of blue pixels in the optical pattern.

5. The method of claim 3, wherein the optical signature comprises a string of characters f(D, R, G, B, S), each character in the optical signature being determined as follows:

$D=f_d$ (number of pixels in the optical pattern);
$R=f_r$ (number of red pixels in the optical pattern);
$G=f_g$ (number of green pixels in the optical pattern);
$B=f_b$ (number of blue pixels in the optical pattern);
$S=f_s$ (a shape indicator).

6. The method of claim 1, wherein the optical pattern is located on a portion of the document.

7. The method of claim 6, wherein the optical pattern is located along an edge of the document.

8. The method of claim 1, wherein the document classification data associated with the optical signature comprises the area, length, width, document type, and map of key coordinates of the document.

9. The method of claim 1, wherein the optical pattern is part of a background pattern of the document.

10. A system for authenticating a lottery ticket having a deformation, the lottery ticket comprising an identifier for authenticating the lottery ticket, the system comprising:
a document reader adapted to generate a document image of the lottery ticket;
a controller configured to decode an optical pattern embedded in the lottery ticket from the document image to determine an optical signature, the optical signature being unique to a particular class of lottery ticket, wherein the optical signature is determined based on a histogram function, the histogram function having inputs comprising the number of red pixels, the number of green pixels, and the number of blue pixels in the optical pattern;
a database configured to store document classification data for each class of lottery ticket;
the controller configured to receive document classification data, which is unique for each particular class of lottery ticket, associated with the optical signature for the lottery ticket;
the controller configured to generate a corrected document image by applying an image correction technique to the document image based on the document classification data; and the controller configured to decode the identifier of the lottery ticket from the corrected document image to authenticate the lottery ticket.

11. The system of claim 10, wherein the optical pattern defines a plurality of pixels in the document image, the plurality of pixels comprising a plurality of red pixels, a plurality of green pixels, and a plurality of blue pixels.

12. The system of claim 11, wherein the optical signature is determined based at least in part on the number of red pixels, the number of green pixels, and the number of blue pixels in the optical pattern.

13. The system of claim 11, wherein the optical signature comprises a string of characters f(D, R, G, B, S), each character in the optical signature being determined as follows:

$D = f_d$ (number of pixels in the optical pattern);
$R = f_r$ (number of red pixels in the optical pattern);
$G = f_g$ (number of green pixels in the optical pattern);
$B = f_b$ (number of blue pixels in the optical pattern);
$S = f_s$ (a shape indicator).

14. The system of claim 10, wherein the document classification data comprises an area, length, width, lottery ticket type, map of key coordinates and game number of the lottery ticket.

15. The system of claim 10, wherein the optical pattern is part of a background pattern of the lottery ticket.

* * * * *